(12) United States Patent
Ishikawa et al.

(10) Patent No.: US 10,162,171 B2
(45) Date of Patent: Dec. 25, 2018

(54) SCANNING OPTICAL SYSTEM AND LIGHT PROJECTING AND RECEIVING APPARATUS

(71) Applicant: KONICA MINOLTA, INC., Chiyoda-ku (JP)

(72) Inventors: Ryouta Ishikawa, Chiyoda-ku (JP); Shoji Kogo, Chiyoda-ku (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/518,200

(22) PCT Filed: Oct. 6, 2015

(86) PCT No.: PCT/JP2015/078325
§ 371 (c)(1),
(2) Date: Apr. 10, 2017

(87) PCT Pub. No.: WO2016/056544
PCT Pub. Date: Apr. 14, 2016

(65) Prior Publication Data
US 2017/0293138 A1 Oct. 12, 2017

(30) Foreign Application Priority Data
Oct. 9, 2014 (JP) .................................. 2014-207854

(51) Int. Cl.
*G02B 26/08* (2006.01)
*G02B 26/12* (2006.01)
(Continued)

(52) U.S. Cl.
CPC ............ *G02B 26/129* (2013.01); *G01S 7/481* (2013.01); *G01S 7/4817* (2013.01); *G02B 5/09* (2013.01);
(Continued)

(58) Field of Classification Search
CPC ...... G02B 26/10; G02B 26/12; G02B 26/125; G02B 26/126; G02B 26/129; G02B 5/08; G02B 5/09; G02B 27/0031; G01S 7/481
(Continued)

(56) References Cited

U.S. PATENT DOCUMENTS

| 5,000,529 | A | * | 3/1991 | Katoh | ................... | G02B 5/09 |
| | | | | | | 235/462.39 |
| 5,028,103 | A | | 7/1991 | Fukasawa et al. | | |
| 2009/0195848 | A1 | | 8/2009 | DeBenedictis et al. | | |

FOREIGN PATENT DOCUMENTS

| DE | 202005005448 | 7/2005 |
| JP | 50-109737 | 8/1975 |

(Continued)

OTHER PUBLICATIONS

Search Report dated Feb. 13, 2018 which issued in the corresponding European Patent Application No. 15849446.8.

*Primary Examiner* — Euncha Cherry
(74) *Attorney, Agent, or Firm* — Cozen O'Connor

(57) ABSTRACT

A scanning optical system, includes a mirror unit having a first mirror surface and a second mirror surface which incline to a rotation axis; and a light projecting system having a light source. A light flux emitted from the light source is reflected on the first mirror surface of the mirror unit, thereafter, reflected on the second mirror surface, and then, projected so as to scan in a main scanning direction onto an object in accordance with rotation of the mirror unit. In the case where a virtual plane is set in a range including the object, a light flux reflected on the second mirror surface has, upon entering the virtual plane, a cross sectional shape in which a length in a direction orthogonal to the main scanning direction is longer than a length in the main scanning direction.

8 Claims, 13 Drawing Sheets

(51) Int. Cl.
    *G01S 7/481*          (2006.01)
    *G02B 26/10*         (2006.01)
    *G02B 5/09*           (2006.01)
    *G02B 27/00*         (2006.01)

(52) U.S. Cl.
    CPC ............. *G02B 26/10* (2013.01); *G02B 26/12* (2013.01); *G02B 26/126* (2013.01); *G02B 27/0031* (2013.01)

(58) Field of Classification Search
    USPC ...................................................... 359/208.1
    See application file for complete search history.

(56) References Cited

FOREIGN PATENT DOCUMENTS

| | | |
|---|---|---|
| JP | 062964/1976 | 11/1977 |
| JP | 1-315716 | 12/1989 |
| JP | 2014-006110 | 1/2014 |
| WO | WO 2005/098509 | 10/2005 |
| WO | WO 2014/168137 | 10/2014 |
| WO | WO 2015/122095 | 8/2015 |

\* cited by examiner

SPOT ROTATION ANGLE

LONGITUDINAL DISTORTION

SPOT ROTATION ANGLE

LONGITUDINAL DISTORTION

MAIN SCANNING ANGLE (deg)

(a)

(b)

LONGITUDINAL DISTORTION

SPOT ROTATION

SCANNING OPTICAL SYSTEM AND LIGHT PROJECTING AND RECEIVING APPARATUS

RELATED APPLICATIONS

This is a U.S. National Phase Application under 35 USC 371 of International Application PCT/JP2015/078325 filed on Oct. 6, 2015.

This application claims the priority of Japanese application no. 2014-207854 filed Oct. 9, 2014, the entire content of which is hereby incorporated by reference.

TECHNICAL FIELD

The present invention relates to a scanning optical system suitably used for a light projecting and receiving apparatus which irradiates a laser light flux and the like so as to detect an object and to a light projecting and receiving apparatus.

BACKGROUND ART

In recent years, in the fields, such as vehicles, security robots, unmanned helicopters, and the like, demands to perform obstacle detection in a proceeding direction accurately for the purposes of collision prevention, have been increasing. As methods of detecting obstacles, laser radars which are distance measuring apparatuses utilizing optical scanning, have been known. General laser radars are configured to rotate or oscillate a mirror, a polygon mirror or the like while projecting light fluxes emitted from a laser light source onto the mirror, the polygon mirror, or the like so as to scan a wide range and to receive scattered light rays from a light-projected object with a light receiving element, thereby performing shape measurement and distance measurement.

PTL 1 discloses a technique with regard to a polygon mirror which includes the even number of planar reflective surfaces and performs scanning by reflecting light rays the even number of times.

CITATION LIST

Patent Literature

PTL 1: JP S50-109737A

SUMMARY OF INVENTION

Technical Problem

By the way, in the case where an object located at a distant place is made to a measurement object with a laser radar, as the density of laser light fluxes irradiated to the object is higher, the light amount of the reflected light fluxes increases. Accordingly, it becomes possible to acquire the shape of the object and a distance to the object with sufficient accuracy. On the other hand, if light fluxes emitted from a laser light source are narrowed via an optical element etc., the density of the light fluxes can be increased. However, the irradiated spot diameter becomes smaller correspondingly to it, a range capable of being measured at one time becomes narrow, and a measurement efficiency lowers. Namely, on the assumption that the emission intensity of a laser light source is limited, it can be said that the density of light fluxes and measurement efficiency generally become a relationship of trade-off. On the other hand, there is also a request to measure an object in a wide range as much as possible. However, a polygon mirror disclosed in PTL 1 is originally used for scanning a screen of television images, etc., and a technique to solve the above-mentioned problems concerning the radar has not been disclosed.

The present invention has been achieved in view of the above-mentioned circumstances, and an object of the present invention is to provide a scanning optical system which can obtain a reflected light flux with sufficient intensity to a measurement object in a wide range, and a light projecting and receiving apparatus.

Solution to Problem

In order to realize at least one of the object mentioned above, a scanning optical system reflecting one aspect of the present invention, includes:

a mirror unit equipped with a first mirror surface and a second mirror surface each of which inclines to a rotation axis; and a light projecting system including at least one light source to emit a light flux toward the first mirror surface, wherein a light flux emitted from the light source is reflected on the first mirror surface of the mirror unit, thereafter, reflected on the second mirror surface, and then, projected so as to scan in a main scanning direction onto an object in accordance with rotation of the mirror unit, and wherein, in a case where a virtual plane is set on a range including the object, a light flux reflected on the second mirror surface has, upon entering the virtual plane, a cross sectional shape in which a length in a direction orthogonal to the main scanning direction is longer than a length in the main scanning direction.

According to this scanning optical system, since a light flux emitted from the light source is reflected twice on the first mirror surface and on the second mirror surface, it becomes possible to project a light flux in which a change in a rotation angle of a cross sectional shape (a beam profile) orthogonal to a proceeding direction is less likely to occur in a scanning range. Therefore, in the case where a virtual plane is set on a range including an object, a light flux reflected on the second mirror surface has, at the time of entering the virtual plane, a cross sectional shape which becomes difficult to change in accordance with a main scanning angle. Accordingly, the cross sectional shape of a projected light flux is maintained such that a length in a direction (sub-scanning direction) orthogonal to the main scanning direction is longer than a length in the main scanning direction. Herewith, it becomes possible to project a light flux in a range wider in the sub-scanning direction by scanning of one time. Therefore, even though the number of scanning times is small, an object in a wide measurement range can be measured.

Advantageous Effects of Invention

According to the present invention, it becomes possible to provide a scanning optical system which can obtain a reflected light flux with sufficient intensity to a measurement object in a wide range, and a radar.

BRIEF DESCRIPTION OF DRAWINGS

FIG. 8 FIG. 8(a) is a front view of a scanning optical system according to the present embodiment, and FIG. 8(b) is a view seeing in the direction of a rotation axis and showing a state of the center of a main scanning angle.

FIG. 9 FIG. 9(a) is a front view of a scanning optical system according to the present embodiment, and FIG. 9(b) is a view seeing in the direction of a rotation axis and showing a state of the periphery of a main scanning angle.

FIG. 15 FIG. 15(a) is a schematic constitutional illustration of a laser radar LR according to the present embodiment, and FIG. 15(b) is a perspective view showing a light emitting surface shape of a semiconductor laser.

DESCRIPTION OF EMBODIMENTS

In the following description, a main scanning angle means an azimuthal angle of the center of a rotation axis of a projected light flux deflected by a mirror unit; a sub-scanning angle means an elevation/depression angle of a projected light flux with reference to a plane, made as a standard, orthogonal to a rotation axis; a spot rotation angle means an angle of the orientation of a light flux rotating around a light projecting direction serving as a rotation center; and longitudinal distortion means a deviation of an angle in the sub-scanning direction at the time of scanning a periphery with respect to an angle in the sub-scanning direction at the center of the main scanning direction.

Figure 1:
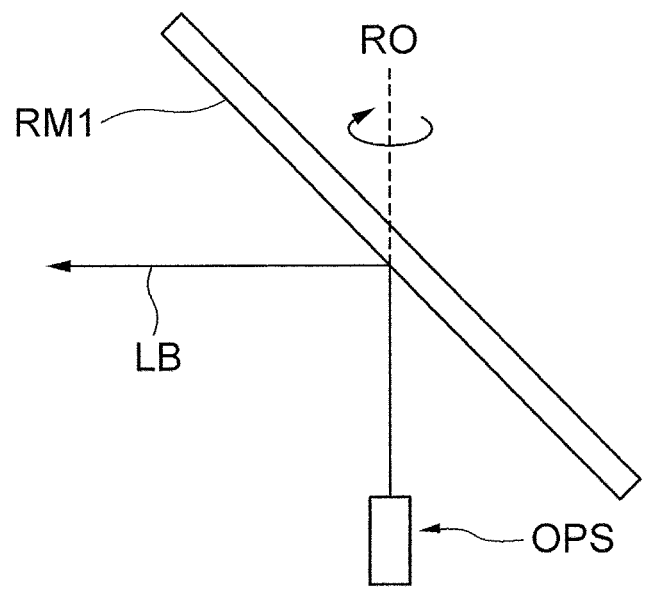
FIG. 1 is an illustration showing a scanning optical system of a comparative example.

Hereinafter, the present embodiment will be described with reference to the attached drawings. First, consideration is given to a comparative example where, as shown in FIG. 1, one reflective surface RM is inclined by 45 degrees to the rotation axis RO, and the reflective surface RM1 is rotated around the rotation axis RO while a light flux LB emitted from a light source OPS along the rotation axis RO direction is made to enter the reflective surface RM1. In this comparative example, it becomes possible to project the light flux LB over a certain angle range from the reflective surface RM1 without displacing the light source OPS. This operation is called scanning, and a direction in which the light beam LB moves in association with the rotation of the reflective surface RM1 is called a main scanning direction. Since the optical axis of the light source OPS (or a light projecting system including a light source OPS and a lens or a prism) and an optical path in the light projecting direction from the reflective surface RM 1 can be made to intersect with each other, it is possible to project a light flux over a wide range.

Figure 2:
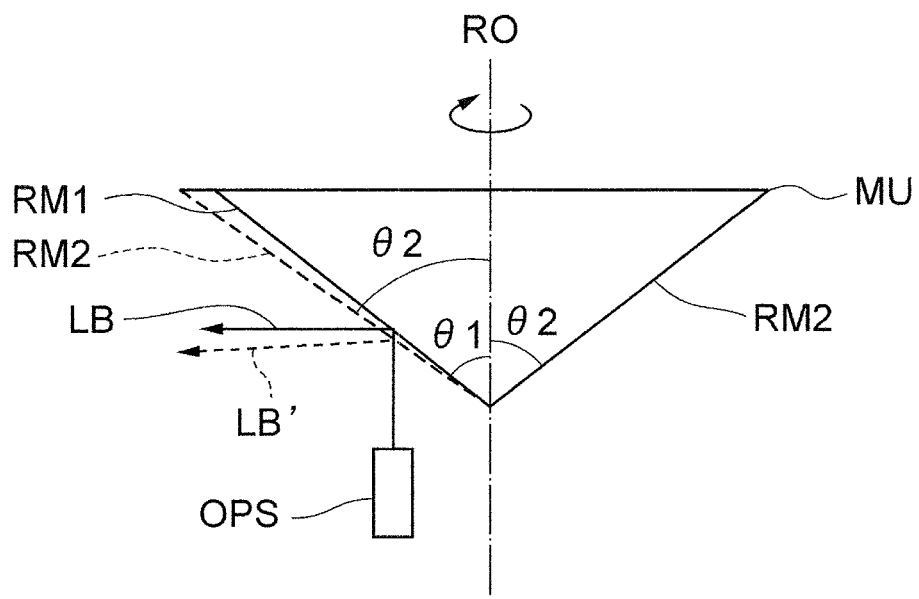
FIG. 2 is an illustration showing a scanning optical system of a comparative example.

In the case of using the reflective surface RM1 shown in FIG. 1, since the light flux LB moves continuously with respect to a main scanning direction, it becomes possible to scan a measurement object without omission (missing), irrespective of the shape of a light flux. On the other hand, in the sub-scanning direction orthogonal to the main scanning direction, a range to which the light flux LB is projected by one time scanning is limited to the length of the light flux LB in the sub-scanning direction. Accordingly, in order to expand a measurable range, it is said that it is desirable to make a length in the sub-scanning direction as long as possible in a cross sectional shape orthogonal to a proceeding direction of a light flux proceeding toward a measurement object. However, there is a limit in the making a length in the sub-scanning direction longer in the cross sectional of a light flux. Then, as shown in FIG. 2, for example, consideration is given to a case where there is provided a mirror unit MU in which a plurality of reflective surfaces RM1 and RM2 are disposed so as to make angles (•1 and •2) different from each other to the rotation axis RO. In the case where this mirror unit MU is rotated around the rotation axis RO, light fluxes LB and LB' are projected with respective different emission angles by the reflective mirrors RM1 and RM2 different in angle so that the light fluxes LB and LB' are projected to the respective different sub-scanning ranges, whereby the measurement range can be made two dimensional.

Figure 3:
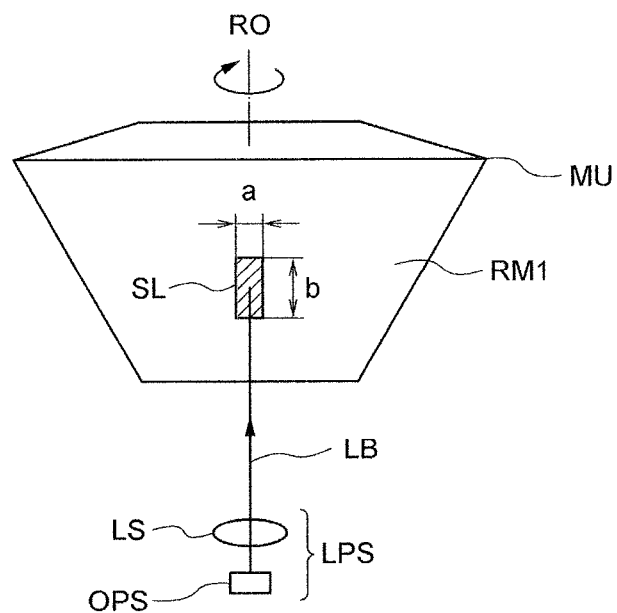
FIG. 3 is a schematic illustration showing a scanning optical system of a comparative example, and is a view seen from a front face.
Figure 4:
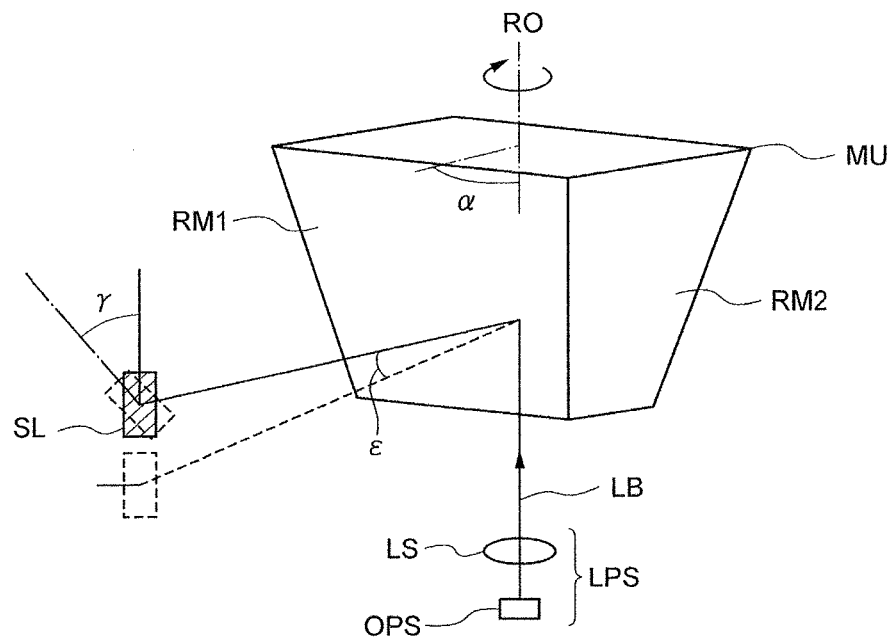
FIG. 4 is a schematic illustration showing a scanning optical system of a comparative example, and is a view showing a state where the scanning optical system rotates.

Here, description is given to problems in the case where a light flux emitted from a light source is reflected only one time on a mirror surface and is made to proceed to a measuring object. FIGS. 3 and 4 show a scanning optical system of a comparative example. In the case of using the scanning optical system of the comparative example in which a laser light flux (hereinafter, referred to as a spot light) emitted from a light projecting system LPS is reflected only one time, and then, is made to proceed to a measurement object, problems described below occur. In FIG. 3, a mirror unit MU which includes a reflective surface RM1 inclining to a rotation axis RO is being rotated around the rotation axis RO. A spot light SL emitted from a light source OPS of a light projecting system LPS in a direction along the rotation axis RO is assumed to have a ratio between a transverse size and a longitudinal size which are different from each other. Therefore, in FIG. 3, a spot light SL which is reflected on the reflective surface RM1 and advances toward an object, is made to proceed in a direction vertical to a sheet surface. At this time, the spot light SL has a cross section (indicated with hatching) orthogonal to its proceeding direction which is assumed to become a rectangular cross section with a length "a" in a main scanning angle direction (a horizontal direction in the figure) and a length "b" (>"a") in a sub-scanning angle direction (a vertical direction in the figure) on a virtual plane apart from the reflective surface RM1.

In the case where the mirror unit MU shown in FIG. 3 is rotated, a light flux LB reflected on the reflective surface RM1 proceeds in the horizontal direction as shown in FIG. 4. With this movement, the light flux LB scans a range where a measurement object exists. However, spot rotation occurs on a spot light SL. Moreover, in the case where the light flux LB enters the reflective surface RM1 in nonparallel to the rotation axis RO, longitudinal distortion also occurs (spot rotation differs from that in the case of entering in parallel). In concrete terms, in the longitudinal distortion, a spot light SL is distorted in the sub-scanning angle direction, and a gap between scanning lines becomes narrower or wider. That is, in FIG. 4, the longitudinal distortion represents a phenomena that a spot light SL shifts (indicated with a broken line) in an axial line direction of the rotation axis RO relative to a direction (indicated with a solid line) prospected to proceed originally. This shift amount is denoted with an angle deviation (•) in the sub-scanning angle direction. On the other hand, in the case where a length in a main scanning angle direction is different from a length in a sub-scanning angle direction in the cross sectional shape of the spot light SL, rotation of the spot light makes a gap between spot lights narrower or wider. In FIG. 4, it means a phenomenon that the spot light SL rotates as indicated with a one dot chain line relative to an original attitude direction (indicated with a solid line). The rotation angle • is called a spot rotation angle.

Figure 5:
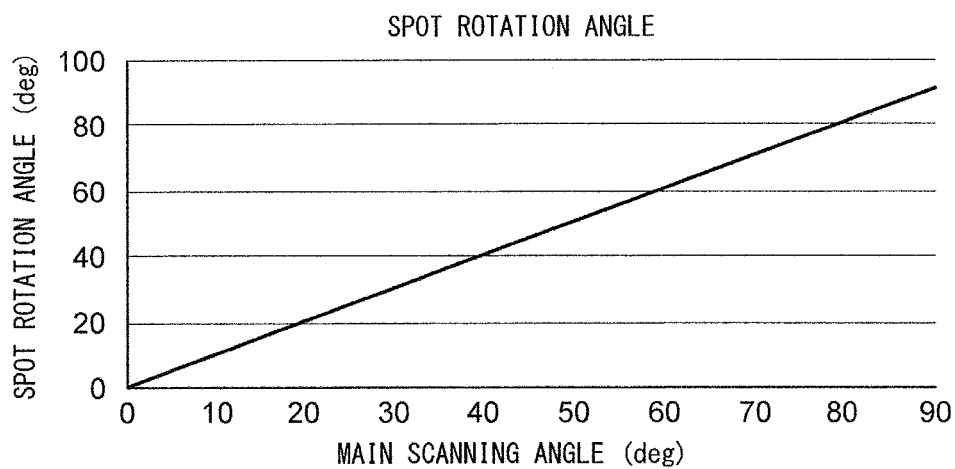
FIG. 5 is a graph showing a relationship between a main scanning angle and a spot rotation angle in a scanning optical system of a comparative example.

FIG. 5 is a diagram showing a relationship between a main scanning angle and a spot rotation angle in the case where a light flux is made to enter, in parallel to the rotation axis, a reflective surface inclining by 45 degrees relative to the rotation axis shown in FIG. 1. Here, in the case where a light flux is made to enter the reflective surface RM in parallel to the rotation axis, the main scanning angle becomes the same as the rotation angle. As shown in FIG. 5, as the rotation angle • of the reflective surface RM1 increases, the spot rotation angle • increases.

Figure 6:
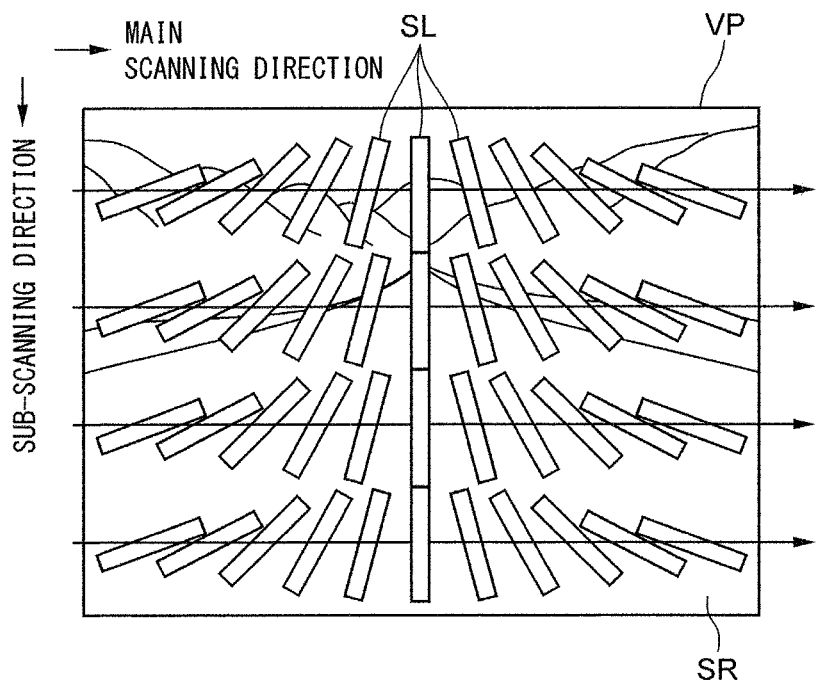
FIG. 6 is a diagram showing a situation where the inclination of a spot light projected onto a virtual plane including a measurement object from a scanning optical system of a comparative example changes depending on a position in a main scanning direction.

FIG. 6 is a diagram which shows a situation where the inclination of a spot light projected onto a virtual plane VP (herein, a plane orthogonal to a main scanning angle center direction) including a measurement object from such a scanning optical system changes depending on a position in the main scanning direction, and shows an example where a spot light is made to shift in the sub-scanning direction for each scanning. Here, longitudinal distortion is ignored. In FIG. 6, a surface on which a spot light SL is made to scan is set to a scanning surface SR. As is clear from FIG. 6, a spot light SL proceeding toward the center of the reflective surface RM1 has a spot rotation angle • of 0 degree and stands vertically relative to the main scanning direction. On the other hand, a spot light SL proceeding toward a periphery of the reflective surface RM1 has an increased spot rotation angle •. That is, as the spot light SL proceeds closer to the periphery, an inclination becomes larger. With this, at the center of the scanning surface SR, a range capable of being covered by the main scanning of one time is wider in the sub-scanning direction. On the other hand, at the both ends of the scanning surface SR, a range capable of being covered by the main scanning of one time becomes narrower in the sub-scanning direction. Accordingly, there is a fear that omission of measurement (missing measurement) for an object may occur. For this reason, in the case of scanning a wide angle, the width of a light flux in the sub-scanning direction has been unable to be made longer as compared with the width of a light flux in the main scanning direction. That is, in the case where the cross sectional shape of the spot light SL is, for example, a round shape or a shape (an aspect ratio) in which a length in the main scanning angle direction is approximately the same with a length in the sub-scanning angle direction, there is no problem. However, in the case where a length in the main scanning angle direction is different from a length in the sub-scanning angle direction, problems may arise.

Figure 7:
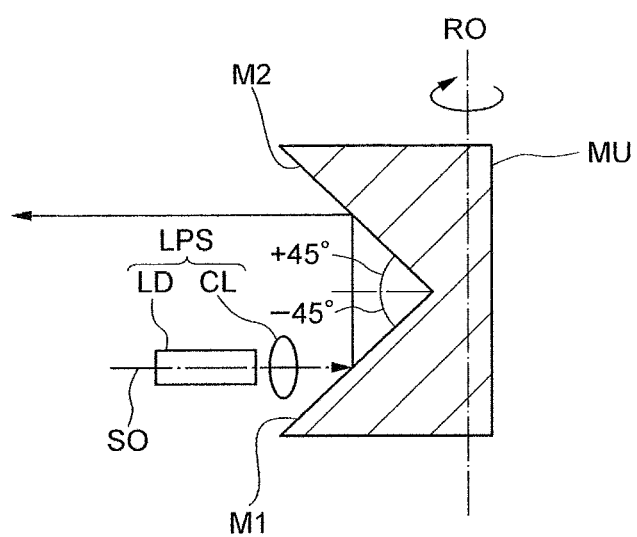
FIG. 7 is an illustration showing a scanning optical system according to the present embodiment by cutting it on a plane including a rotation axis.
Figure 8:
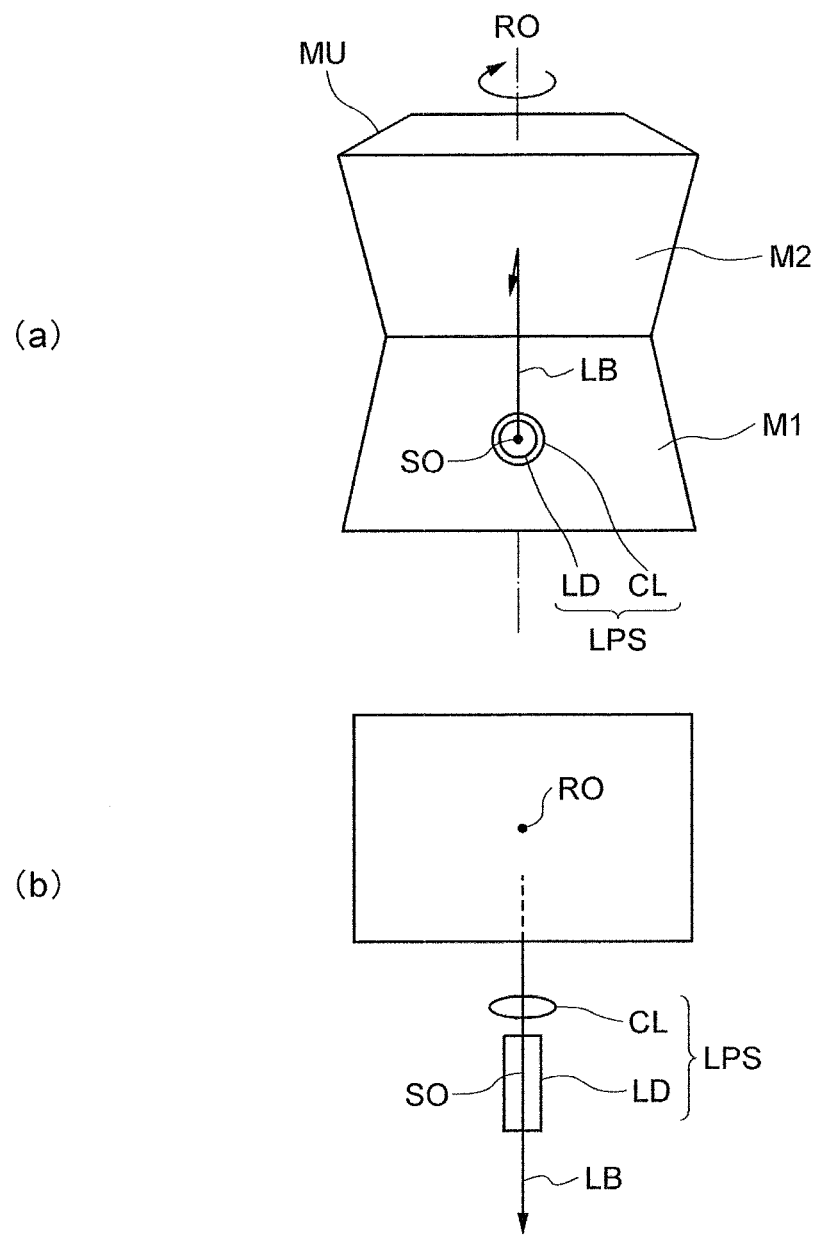
Figure 9:
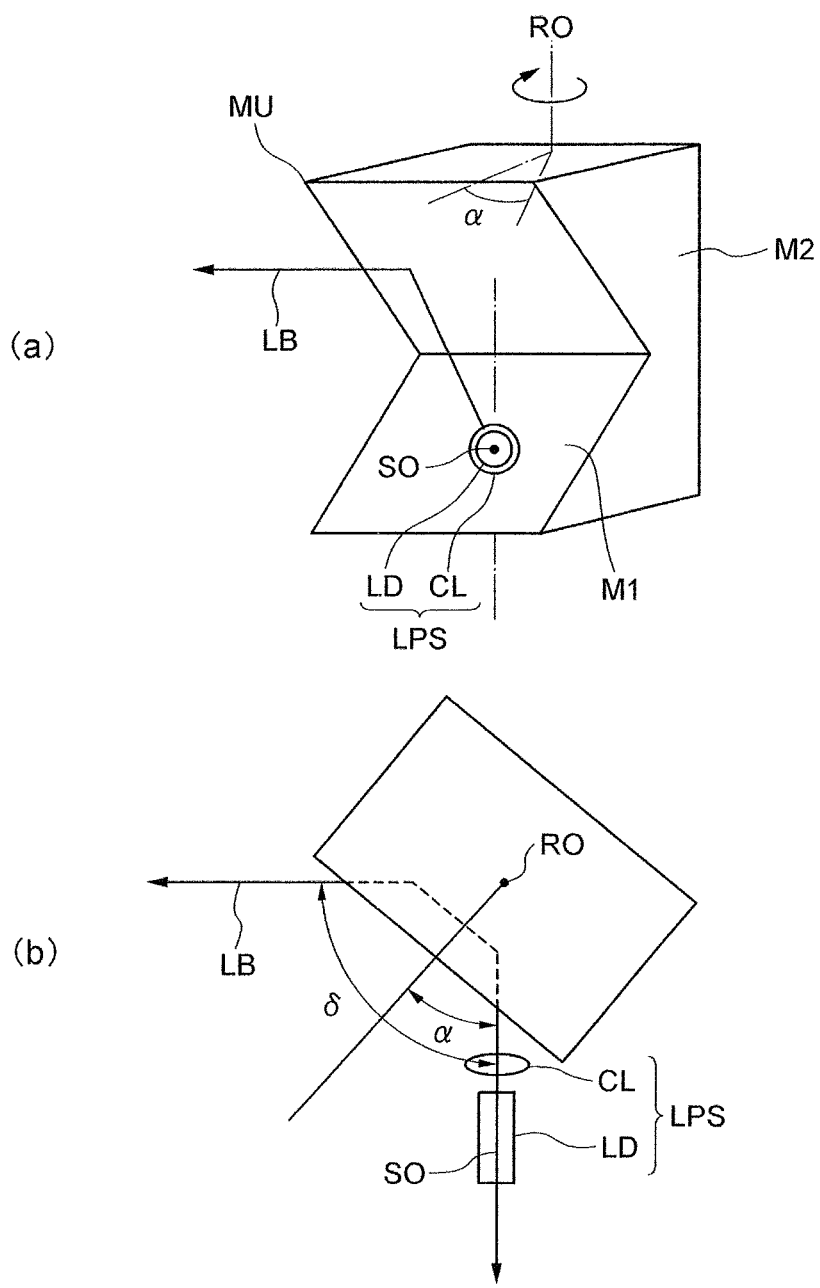

Hereinafter, an embodiment of the present invention which solves the above problems will be described. FIG. 7 is a cross sectional view, along a rotation axis RO, showing a scanning optical system of the present embodiment. FIG. 8(a) is a front view of the scanning optical system of the present embodiment, and FIG. 8(b) is a view seeing in the direction of a rotation axis and showing a state of the center of the main scanning angle. FIG. 9(a) is a front view of a scanning optical system of the present embodiment, and FIG. 9(b) is a view seeing in the direction of a rotation axis and showing a state of the periphery of the main scanning angle. Here, the scanning optical system is constituted by a mirror unit MU and a light projecting system LPS. A cross section of a spot light orthogonal to the proceeding direction, is assumed to be similar to that in the comparative example.

As shown in FIG. 7, an optical axis SO of a light projecting system LPS including a semiconductor laser LD as a light source and a collimator lens CL is disposed so as to be orthogonal to a rotation axis RO of a mirror unit MU including a first mirror surface M1 and a second mirror surface M2. At this time, the light projecting system LPS is disposed on the first mirror surface M1 side relative to the apex, serving as a position reference, of an intersection angle formed by the first mirror surface M1 and the second mirror surface M2. Herein, the first mirror surface M1 is disposed so as to incline at an angle of −45 degrees from a flat plane orthogonal to the rotation axis RO relative to the optical axis direction of the light projecting system LPS, and the second mirror surface M2 is disposed so as to incline at an angle of +45 degrees from a flat plane orthogonal to the rotation axis relative to the optical axis direction of the light projecting system LPS.

As shown in FIGS. 8(a) and 8(b), when the rotating position of the mirror unit MU becomes an angle at which the optical axis SO of the light projecting system LPS is located within a plane which includes the first mirror surface M1 and a normal line of the second mirror surface M2 (a state where the optical axis SO is oriented toward the center of the main scanning angle), the light flux LB emitted from the light projecting system LPS is reflected on the first mirror surface M1, proceeds in parallel to the rotation axis RO, and then, is reflected on the second mirror surface M2. Successively, the reflected light flux LB is projected from the second mirror surface M2 to an object. At this time, as shown in FIG. 8(a), in the case where the mirror unit MU is seen from the light projecting direction, the optical axis SO of the light projecting system LPS may be displaced to the right or the left from the rotation axis RO.

Furthermore, as shown in FIGS. 9(a) and 9(b), in the case where the mirror unit MU is rotated only by a rotation angle • of 45 degrees from the center of the main scanning angle (a state shown in FIG. 8) around the rotation axis RO, a main scanning angle as a relative angle difference between a light flux LB after having been reflected on the second mirror surface M2 and a light flux LB immediately after having been emitted from the light projecting system (as shown in FIG. 9(b), when viewing from the rotation axis RO, an angle • formed by the optical axis SO of the light projecting system LPS and a light flux LB emitted from the mirror unit MU), becomes 90 degrees. Namely, it turns out that the main scanning angle (•=90 degrees) being two times the rotation angle (•=45 degrees) has been obtained.

Figure 10:
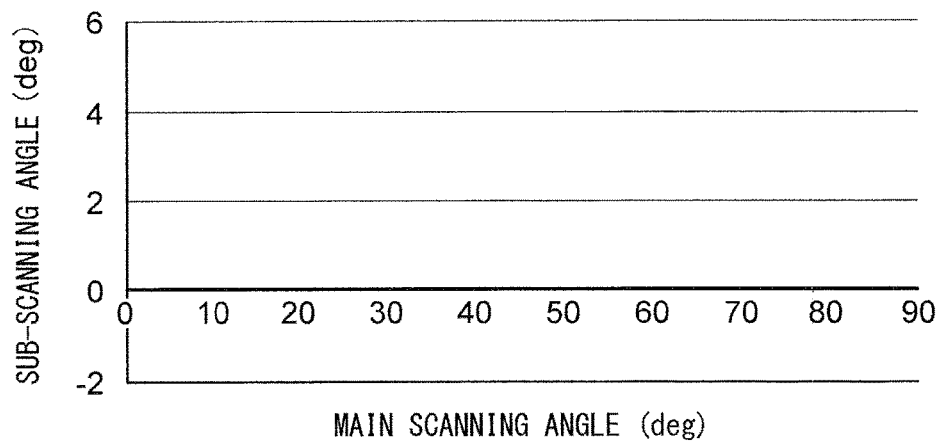
FIG. 10 is a graph showing longitudinal distortion of a scanning optical system according to the present embodiment.
Figure 11:
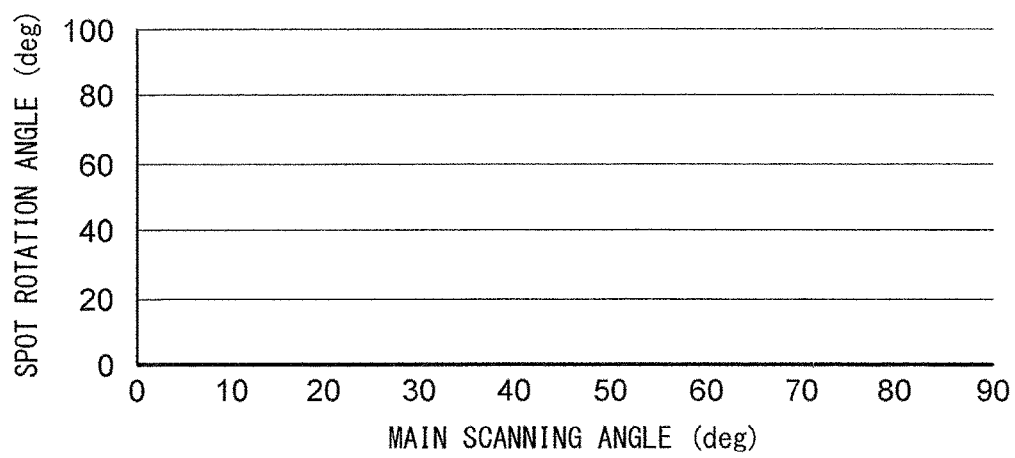
FIG. 11 is a graph showing a relationship between a main scanning angle and a spot rotation angle in a scanning optical system according to the present embodiment.

A relationship of longitudinal distortion (indicated with a sub-scanning angle) relative to the main scanning angle • in this case is shown in FIG. 10, and a relationship of a spot rotation angle relative to the main scanning angle • is shown in FIG. 11. In this way, in the case where an angle formed by the first mirror surface M1 and the second mirror surface M2 is 90 degrees, even if the main scanning angle • changes, neither longitudinal distortion nor the spot rotation angle changes. Therefore, a spot light with a cross section shape orthogonal to a proceeding direction which is longer in the sub-scanning direction is projected with parallel movement to an object, whereby it becomes possible to scan ideally. Namely, it is shown that a spot rotation can be suppressed by reflecting a spot light two times on the first mirror surface M1 and the second mirror surface M2. The use of such a mirror unit MU makes it possible to realize a laser radar in which spot rotation is not caused on the entire region of the main scanning angle.

Figure 12:
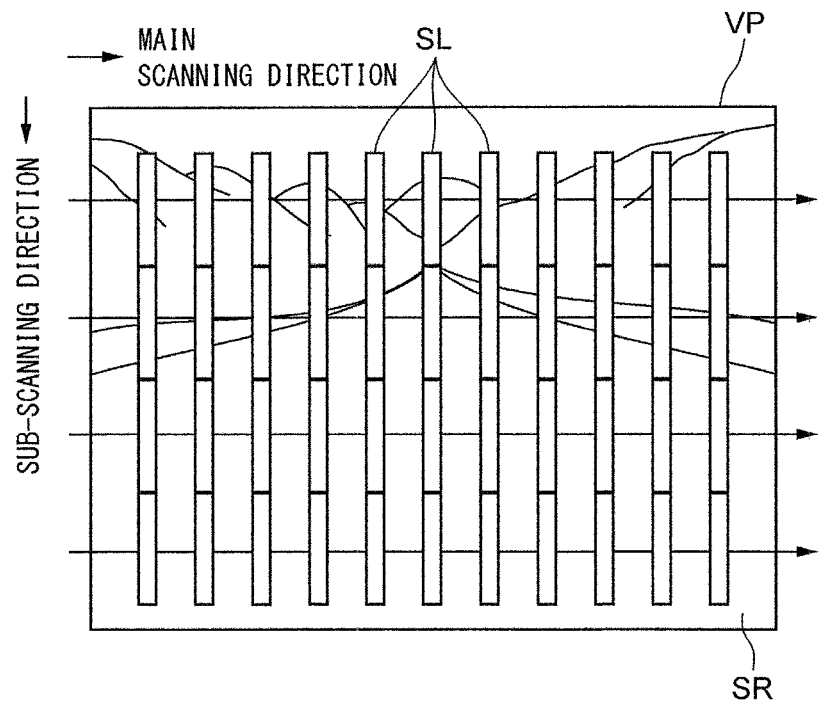
FIG. 12 is a diagram showing a situation where the inclination of a spot light projected onto a virtual plane including a measurement object from a scanning optical system according to the present embodiment does not change depending on a position in a main scanning direction.

FIG. 12 is a diagram showing a situation where the inclination of a spot light projected to a virtual plane VP (herein, a plane orthogonal to the main scanning angle center direction) including a measurement object from the scanning optical system according to the present embodiment does not change depending on a position in the main scanning direction, and shows an example which includes four sub-scanning directions. In FIG. 12, a surface on which a spot light SL is made to scan is made to a scanning surface SR. As is clear from FIG. 12, the cross sectional shape of a spot light SL is almost maintained regardless of a main scanning angle such that a length in the sub-scanning direction is longer than that in the main scanning direction. Accordingly, a light flux can be irradiated to a measuring object which exists at any place of a scanning surface. Herein, it is preferable that spot lights SL arranged side by side in the sub-scanning direction are made to come in contact with each other or superimposed on each other. With this, the measurement can be performed without omission in the sub-scanning direction.

Next, the influence of longitudinal distortion is considered. In the case of actually using the mirror unit MU shown in FIG. 7 and so on in a radar, the sub-scanning angle of a measurement range may not be 0 degree, or an incident angle and a sub-scanning angle may not coincide with each other. Furthermore, there are the actual circumstances that since a length in the sub-scanning direction on a cross section orthogonal to the proceeding direction of a spot light is limited, a measuring range where an object exists is required to be divided into the sub-scanning direction. Therefore, it is desirable that a plurality of pairs of the first mirror surface and the second mirror surface are disposed on the mirror unit MU, and that an angle formed by the first mirror surface and the second mirror surface is shifted from 90 degrees for each pair such that light fluxes passing the respective mirror pairs are shifted separately in the sub-scanning angle direction so as to scan on the respective different positions in the sub-scanning angle direction.

Figure 13:
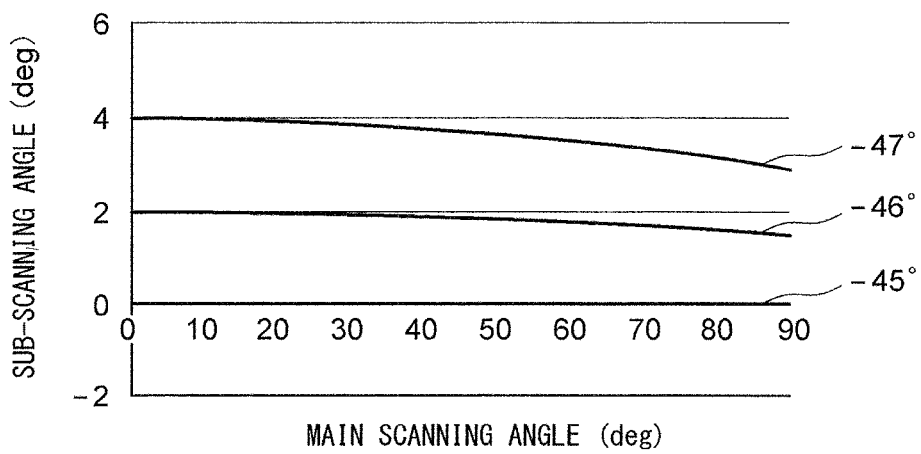
FIG. 13 is a diagram showing a relationship between a main scanning angle and longitudinal distortion in the case of changing the inclination angle of the first mirror surface M1.
Figure 14:
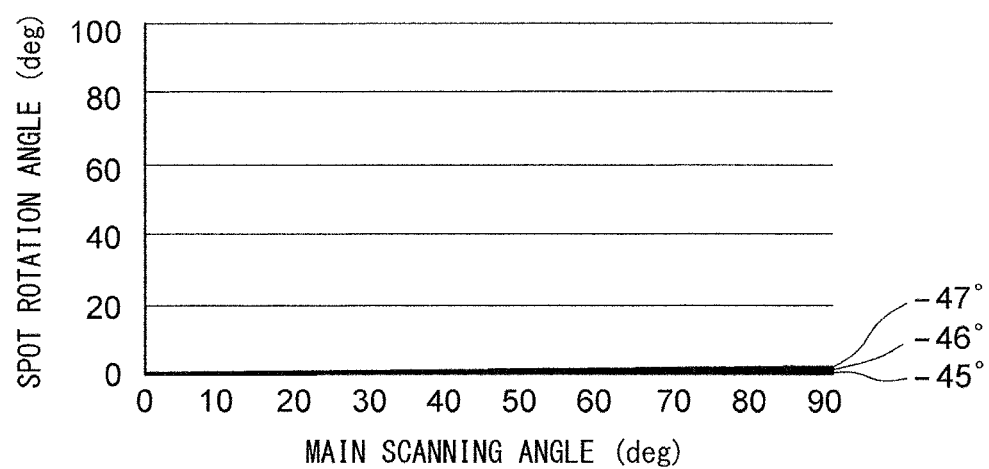
FIG. 14 is a diagram showing a relationship between a main scanning angle and a spot rotation angle in the case where of changing the inclination angle of the first mirror surface M1.

Here, examination is made for longitudinal distortion and spot rotation angle. In the case of changing the inclination angle of the first mirror surface M1, the relationship between a main scanning angle and longitudinal distortion is shown in FIG. 13. In the case of changing the inclination angle of the first mirror surface M1, the relationship between a main scanning angle and a spot rotation angle is shown in FIG. 14. In the case where the first mirror surfaces M1 are made to incline from the state shown in FIG. 7 by −45 degrees, −46 degrees, and −47 degrees from a flat plane orthogonal to the rotation axis RO to the light projecting system side and all the second mirror surfaces M2 are made to incline reversely by 45 degrees, longitudinal distortion and a spot rotation angle are as shown in FIGS. 13 and 14. In the case of changing an angle formed by the first mirror surface M1 and the second mirror surface M2, a degree of a change of each of the longitudinal distortion and the spot rotation changes. However, as can be seen from FIG. 13, since the longitudinal distortion is caused in a direction in which the respective scanning lines come close to each other, a gap has never been formed. The angle of each of the first mirror surfaces M1 and the angle of each of the second mirror surfaces M2 can be set arbitrarily. Moreover, it is not necessary to rotate at constant speed like a laser beam printer. In the case where a light flux is required to be projected only in a certain specific direction, it may be rotated by a required angle, and stopped, or it may be oscillated forward and backward.

In the case where a projected light flux has a cross section shape in which a length in the sub-scanning direction is shorter, it is necessary to use an angle deflecting device to incline a projected light flux in the sub-scanning direction, and it is required to perform scanning many times, which is not desirable. In the mirror unit of the present embodiment, spot rotation can be suppressed. Accordingly, the cross section shape of a light flux is made longer in the sub-scanning direction than in the main scanning direction in a light projection range, whereby it becomes possible to project a light flux to a wide range in the sub-scanning direction with one time scanning while making the density of the light flux higher. Moreover, since longitudinal distortion is small, there is also a merit that it is less likely to cause a deviation in a light projecting angle in the sub-scanning direction on the center and the periphery. Moreover, symmetry to the center of the main scanning angle can be obtained for a spot rotation and longitudinal distortion. Accordingly, if the left main scanning angle and the right main scanning angle are the same, the spot rotation angle and the sub-scanning angle become equivalent to each other.

In the present embodiment, the light projecting system includes at least one light source (LD (Laser Diode), LED (Light Emitting Diode) or a fiber laser). A light flux itself emitted from the light source has a cross sectional shape orthogonal to the proceeding direction in which a length in the direction along the rotation axis of the mirror unit may be made different from a length in the direction orthogonal to it. Alternatively, the distribution of a light flux with a circular cross section emitted from the light source is changed via optical elements such as a cylindrical lens, an anamorphic lens, a beam shaper, and a special prism such that a cross sectional shape orthogonal to the proceeding direction is shaped to make a length in the direction along the rotation axis of the mirror unit different from a length in the direction orthogonal to it. Herein, the term "in the case where a virtual plane is set on a range including an object, a light flux emitted from the second mirror surface has, at the time of entering the virtual plane, a cross sectional shape in which a length in the sub-scanning direction orthogonal to the main scanning direction is longer than a length in the main scanning direction", means as follows. That is, even if a light flux has, immediately after being reflected on the second mirror, a cross sectional shape orthogonal to the proceeding direction viewed from the light projecting direction in which a length in the sub-scanning direction is shorter than that in the main scanning direction, it may be permissible that the flare angle of the light flux in the sub-scanning direction is wider than that in the main scanning direction and the light flux has, at the time of entering the virtual plane, a cross sectional shape in which a length in the sub-scanning direction orthogonal to the main scanning direction is longer. Herein, a length in a cross section of a light flux means a length at the intensity of the light flux which becomes a half-value width or 1/e2 relative to a light amount of a peak intensity in the light flux. Furthermore, it may be permissible that light fluxes from a plurality of light sources are superimposed on each other at the respective end portions such that a length in the sub-scanning direction orthogonal to the main scanning direction is made longer apparently.

The distance measurement (range finding) with a TOF (Time of flight) mode can be performed by using LED or laser, which performs pulse light emission, as a light source of the radar. As compared with conventional scanning optical systems which have been used for radars configured to use a TOF mode, since a change of resolving power is fewer in a wide main scanning angle, it is possible to provide a radar with a wide viewing angle usable effectively.

In the present embodiment, it is preferable that the light receiving system includes at least one optical element, such as CCD (Charge Coupled Device), CMOS (Complementary Metal-Oxide Semiconductor), and PD (Photo Diode), and collects light fluxes reflected from an object via optical components such as a lens, a mirror, and a prism such that information such as an object shape and a distance can be acquired.

Figure 15:
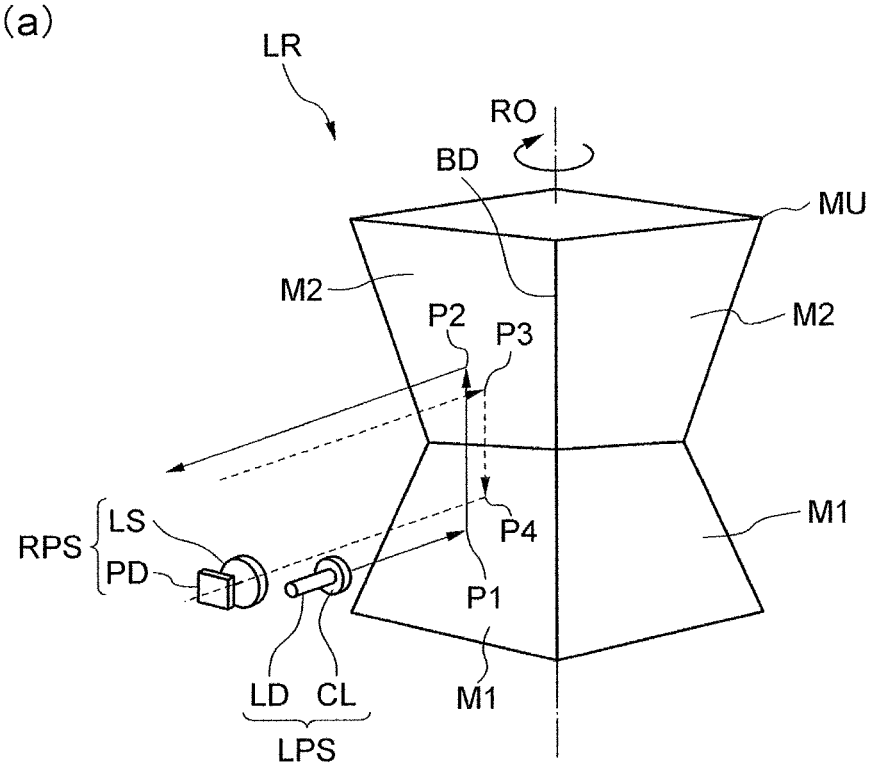
Figure 15:
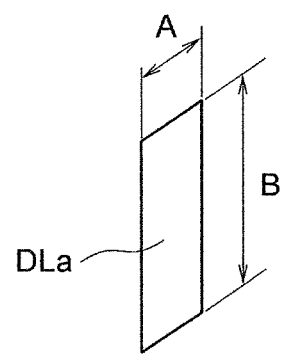

FIG. 15(a) is a perspective view showing a schematic constitution of a laser radar LR according to the present embodiment, in which a shape and length of each of the constitutional elements may differ from the actual shape and length. The laser radar LR includes, for example, a semiconductor laser LD as a light source, a collimator lens CL which converts diverging light fluxes from the semiconductor laser LD into parallel light fluxes, a mirror unit MU which projects scanning laser fluxes made to parallel by the collimator lens CL toward an object side with a rotating reflective surface and reflects the reflected light flux from the object projected with the scanning laser fluxes, a lens LS which collects the reflected light fluxes reflected on the mirror unit MU from the object, and a photo diode PD which receives the light fluxes collected by the lens LS.

The semiconductor laser LD and the collimator lens CL constitute the light projecting system LPS, and the lens LS and the photo diode PD constitute the light receiving system RPS. As shown in FIG. 15(b), a light emitting surface LDa of the semiconductor laser LD is shaped in a rectangular shape in which a length B in the direction along the rotation axis RO is made longer than a length A in the direction orthogonal to it. The light flux emitted from the light projecting system LPS and reflected by the second mirror surface M2 has a cross sectional shape orthogonal to the proceeding direction in which a length in the sub-scanning direction is made longer than a length in the main scanning direction (refer to FIG. 5).

Figure 16:
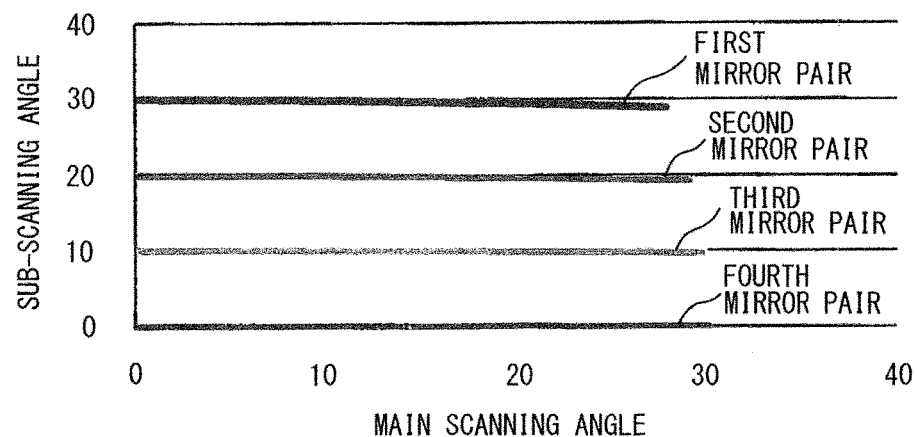
FIG. 16 is a diagram showing longitudinal distortion of a laser radar LR according to the present embodiment.
Figure 17:
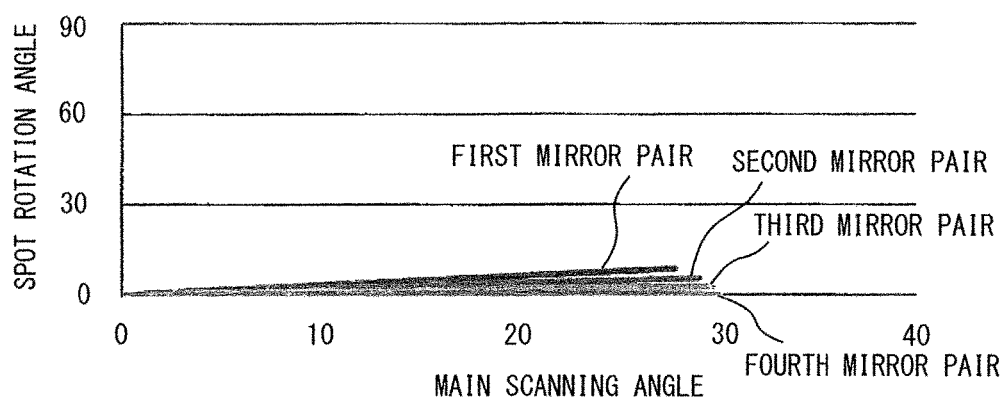
FIG. 17 is a diagram showing a spot rotation angle of a laser radar LR according to the present embodiment.

The approximately square tube-shaped mirror unit MU is made of resin, and is held so as to be rotatable around the rotation axis RO being an axis line. On its lower outer periphery, four trapezoid-shaped first mirror surfaces M1 are disposed, and so as to oppose them, on its upper outer periphery, four trapezoid-shaped second mirror surfaces M2 are disposed. An intersection angle between the first mirror surface M1 and the second mirror M paired vertically in each mirror pair is different from the respective intersection angles of the other mirror pairs. As one example, each of the first mirror surfaces M1 inclines by an angle of 45 degrees to an orthogonal plane to the rotation axis Ro, and the second mirror surfaces M2 incline toward the opposite sides by the respective angles of 60 degrees in the first mirror pair, 55 degrees in the second mirror pair, 50 degrees in the third mirror pair, and 45 degrees in the fourth mirror pair. In this case, longitudinal distortion becomes as shown in FIG. 16, and a spot rotation angle becomes as shown in FIG. 17. Each of the first mirror surface M1 and the second mirror surface M2 is covered with a reflective film by depositing, coating, or planting, or a metal polishing mirror or a film mirror by pasting.

The optical axis of each of the light projecting system LPS and the light receiving system RPS is made orthogonal to the rotation axis RO of the mirror unit MU, and the light projecting system LPS is disposed farther in the direction of the rotation axis RO than the light receiving system RPS. Here, the light projecting system LPS and the light receiving system RPS may be disposed in an arrangement reverse to that shown in the figure.

In the laser radar, in the case where a light quantity distribution in a light flux is not constant, a light amount of returning light fluxes increases or decreases depending on a measurement point, and there is a possibility that a measurement distance may become short depending on a place. Accordingly, it is necessary to make a light amount irradiated to an object constant. For this reason, in the case where a laser of a usual single mode is used for the light source, it is necessary to use a plurality of optical systems, such as a lens and a prism, which becomes a complicated optical system. In contrast, according to the present embodiment, by use of a light source with a light emitting surface LDa which is longitudinally long as shown in FIG. 15(b), even if a light flux is projected from a light source to a distant place in a measuring range, the luminance distribution of the light source is projected as it is. Accordingly, it becomes possible to acquire a light amount distribution near a top hat distribution.

Next, a distance measurement operation of the laser radar LR is described. The diverging light fluxes intermittently emitted in a pulse shape from the semiconductor laser LD are converted into parallel light fluxes by the collimator lens CL. Then, the parallel light fluxes are made to enter the first mirror surface M1 of the rotating mirror unit MU, are reflected on there, further reflected by the second mirror surface M2, and are projected so as to scan toward an object (not shown) side.

The four combinations of the first mirror surface M1 and the second mirror surface M2 in the mirror unit MU have the respective four different kinds of intersection angles. Accordingly, when the mirror unit MU rotates once, it becomes possible to scan four different sub-scanning directions on the object side. With reference to FIG. 12, a laser light flux is reflected sequentially on the first mirror surface M1 and the second mirror surface M2 which are rotating and moving. At this time, first, a laser light flux reflected by the first mirror surface M1 and the second mirror surface M2 of the first pair is made to scan horizontally from the left to the right on the uppermost region on the scanning surface in response to the rotation of the mirror unit MU. Next, a laser light flux reflected by the first mirror surface M1 and the second mirror surface M2 of the second pair is made to scan horizontally from the left to the right on the second region from the top of the scanning surface in response to the rotation of the mirror unit MU. Hereafter, the scanning is repeated similarly, whereby the object side can be scanned two dimensionally.

Among the light fluxes projected for scanning, laser light rays which hit on an object and are reflected by it, enter again the second mirror surface M2 of the mirror unit MU as shown with a broken line in FIG. 15(a), are reflected on there, further reflected by the first mirror surface M1, collected by the lens LS, and detected by the light receiving surface of the photo diode PD, respectively. With this, the object on the object range can be detected.

Figure 18:
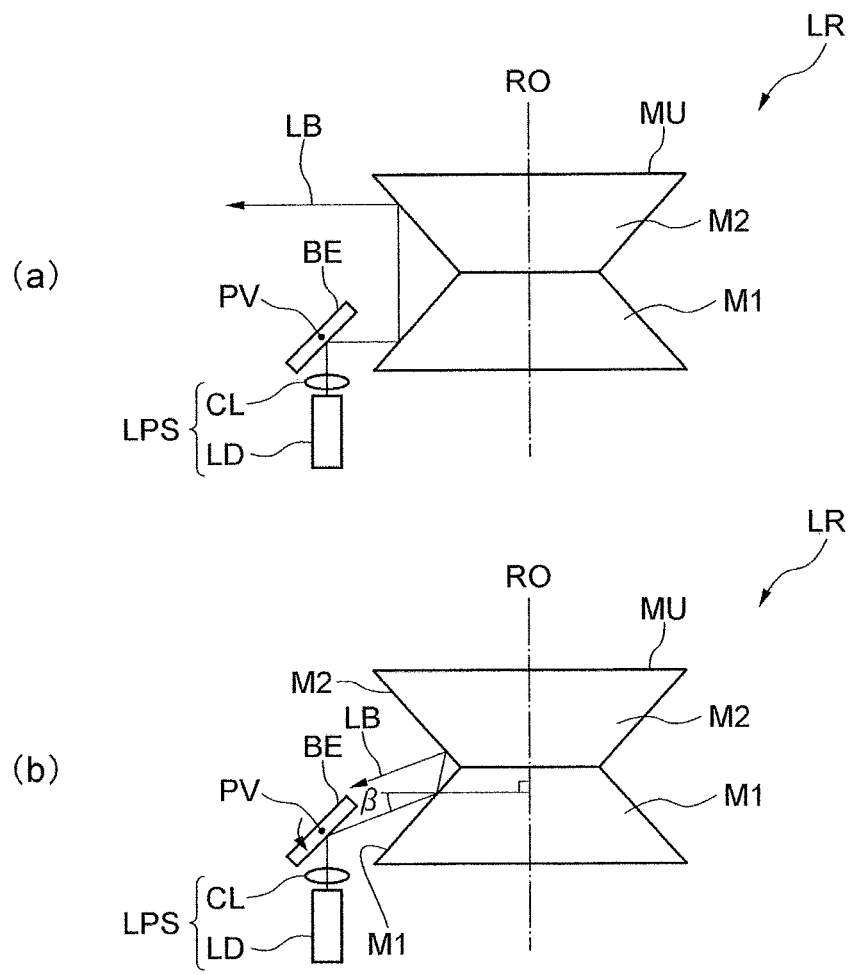
FIG. 18(a) and FIG. 18(b) is a cross sectional view showing a modification embodiment of a scanning optical system according to the present embodiment.

FIG. 18 is a cross sectional view showing a modification embodiment of the present embodiment.

In the modification embodiment shown in FIG. 18, all the respective intersection angles of a plurality of pairs of the first mirror surface M1 and the second mirror surface M2 in the mirror unit MU are constant (90 degrees). Moreover, a light flux LB from the light projecting system LPS is reflected with a reflecting mirror BE used as an example of a deflecting element, reflected by the first mirror surface M1, and then, reflected by the second mirror surface M2. The reflecting mirror BE is made rotatable around an axis line PV extending in a direction vertical to a sheet surface.

Figure 19:
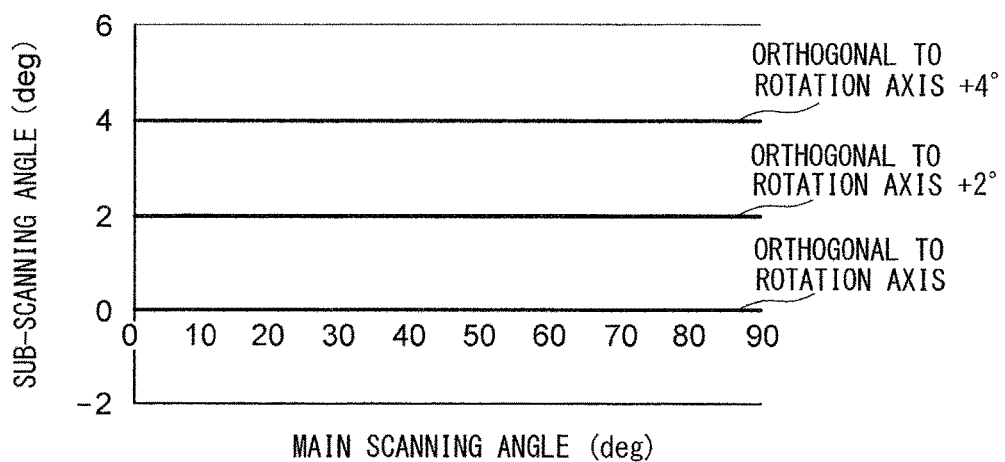
FIG. 19 is a diagram showing a relationship between a main scanning angle and longitudinal distortion in a scanning optical system in the modification embodiment.

As is clear from a comparison between FIGS. 18(a) and 18(b), in the case where the reflecting mirror BE as a deflecting element is rotated around the axis line PV for each time when each pair of the first mirror surface M1 and the second mirror surface M2 passes, an incident angle • of the light flux LB reflected from the reflecting mirror BE to the first mirror surface M1 changes (in FIG. 18(a), •=0). Namely, in the case where the reflecting mirror BE is made to rotate around the axis line PV for each time when each pair of he first mirror surface M1 and the second mirror surface M2 passes, the direction of the light flux LB reflected from the first mirror surface M1 changes, and further, the direction of the light flux LB reflected from the second mirror surface M2 changes in the sub-scanning angle direction. Accordingly, similarly to the above-mentioned embodiment, there is an effect capable of performing scanning in the sub-scanning direction. FIG. 19 is a diagram showing a relationship between a main scanning angle and longitudinal distortion in the case of changing an incident angle to the first mirror surface M1 by using the reflecting mirror BE ((orthogonal to the rotation axis), (orthogonal to the rotation axis)+2 degrees, and (orthogonal to the rotation axis)+4 degrees) in a state where an intersection angle between the first mirror surface M1 and the second mirror surface M2 is 90 degrees in the scanning optical system shown in FIG. 18. From FIG. 19, it turns out that longitudinal distortion does not change on the center and periphery of the main scanning angle. Herein, the deflecting element should not be limited to the reflecting mirror, and an acousto-optical device or a MEMS mirror may be used as the deflecting element.

According to one aspect of the present invention, a mirror unit includes a plurality of pairs of the first mirror surface and the second mirror surface, and the intersection angle between the first mirror surface and the second mirror surface in each pair is different from those in the other pairs. Since the intersection angle between the first mirror surface and the second mirror surface is made different among the plurality of pairs, it becomes possible to perform scanning not only one line, but also a plurality of lines displaced in the sub-scanning direction, whereby it becomes possible to project a light flux to a wide range. Moreover, since the mirror unit can make a main scanning angle larger than a rotation angle, a rotation angle required for a single mirror unit for scanning cam be made small than the conventional method. Accordingly, it become possible to increase the number of scanning lines different in sub-scanning angle. By simply rotating such a mirror unit, it become possible to scan more than the all angle (full angle) of 180 degrees in the direction orthogonal to the rotation axis, and to project a light flux to different scanning lines different in the sub-scanning direction. In the case where it is not necessary to cover a main scanning direction widely, it becomes possible to increase the number of scanning lines in the sub-scanning direction by increasing the number of pairs of the first mirror surface and the second mirror surface. With this, by rotating the mirror unit only one rotation, it becomes possible to project a light flux to a wide range.

According to one aspect of the present invention, a mirror unit includes a plurality of pairs of the first mirror surface and the second mirror surface, and the plurality of pairs include at least two pairs which have the same intersection angle between the first mirror surface and the second mirror surface and at least one pair which has an intersection angle different from that in at least the two pairs. With this, a frame rate etc. can be improved. For example, in the case of using in a vehicle, an environment between a self-vehicle and other vehicles changes quickly. Accordingly, a frame rate becomes more important than a viewing angle. For example, consideration is given to a case where the number of pairs of the first mirror surface and the second mirror surface is four. In the case where these pairs are constituted such that the first pair and the third pair (opposite surfaces) are provide with the same first intersection angle and the second pair and the fourth pair (opposite surfaces) are provide with the same second intersection angle (different from the first intersection angle), a viewing field in the rotation axis direction can be secured, and in addition, a frame rate also can be partially improved. Moreover, consideration is given to a case where the number of pairs of the first mirror surface and the second mirror surface is three. In the case where these pairs are constituted such that the first pair and the second pair are provide with the same first intersection angle and the third pair is provided with a second intersection angle different from the first constituting angle, this constitution is suitable to detect white lines and a center line on a road surface for which a frame rate is not required so much.

According to one aspect of the present invention, there is provided a deflecting element to change the proceeding direction of a light flux emitted from the light source between the light source and the mirror unit. As described by using FIGS. 13 and 14, as an intersection angle between the first mirror surface and the second mirror surface of the mirror unit separates more from 90 degrees, longitudinal distortion and a spot rotation angle become larger. Then, the incident angle of a light flux to the mirror unit is changed in the sub-scanning direction by using the deflecting element as shown in FIG. 18, whereby it becomes possible to shift a scanning line to the sub-scanning direction while using a mirror pair with an intersection angle near to 90 degrees with which the longitudinal distortion and the spot rotation angle can be suppressed. Moreover, a deviation of the incident angle of a light flux to the mirror unit influences the sub-scanning angle. Accordingly, in the case where the whole light projecting system inclines, or at the time of correcting the initial position of a radar, the deflecting element may be used for correcting an incident angle in the sub-scanning direction.

According to one aspect of the present invention, a light emitting surface of a light source is shaped such that a length in the direction along a rotation axis is made longer than a length in the direction orthogonal to the rotation axis. In the case where a cross sectional shape orthogonal to the proceeding direction of a light flux emitted from the light source is a circle or a square shape, it is difficult to use the light flux as it is. Then, a light flux emitted from an LD or an LED in which a light emitting surface has originally a different aspect ratio is made to pass a collimator lens so as to become a parallel light flux, whereby it is possible to acquire a light flux with a desired ratio of a length in the main scanning direction to a length in the sub-scanning direction. However, since general-purpose semiconductor lasers include a light source which does not satisfy a required aspect ratio, the required flare angle of a light flux may be corrected with an anamorphic lens, an expander, and so on.

According to one aspect of the present invention, the light projecting and receiving apparatus includes a scanning optical system and a light receiving system equipped with a light receiving element to receive a reflected light flux reflected from an object. It is desirable that such a light receiving system reflects a reflected light flux reflected from an object by a second mirror surface, further reflects it by a first mirror surface, and thereafter receives the light flux with a light receiving element. This constitution can be used as a laser radar.

It is also possible to project a light flux to a wide range equal to or more that the full angle of 180 degrees with the light projecting system and the mirror unit. However, it is difficult to receive a reflected light flux from an object directly with a light receiving element being a two-dimensional sensor (CMOS, CCD) via a lens, because a required object side opening diameter cannot obtained. Moreover, even if the reflected light flux can be received, there is a fear that resolving power may change between the center and periphery of the main scanning due to distortion by using a lens with a large diameter. Then, as shown in FIG. 15(a), in the case where the light receiving system RPS reflects a reflected light flux reflected from an object by the second mirror surface M2, further reflects it by the first mirror surface M1, and thereafter, receives the light flux with the light receiving element PD, the scanning range can be made wide also in the light receiving similarly to the light projecting. As a result, for example, the light receiving system RPS also can obtain the effects of a low spot rotation angle and low longitudinal distortion of the mirror unit MU in a range of the full main scanning angle of 180 degrees. Moreover, it is also possible to enlarge the opening of the light receiving system RPS. It is an ideal that the respective optical axes of the light receiving system RPS and the light projecting system LPS are parallel to each other. However, a light flux may be received by displacing the optical axis with a lens or a free curved surface mirror. Moreover, in the case where the light receiving element includes a plurality of elements in the direction in which the cross section shape orthogonal to the proceeding direction of a received light flux is longer, it is also possible to increase resolving power.

Moreover, in the scanning with a reflective mirror to reflect a light flux one time, in the case where a light receiving system is configured to be arranged so as to receive a light flux after being reflected by a scanning reflective mirror, there is a possibility that the optical surface of the light receiving system is exposed directly to sunlight. In that case, there is a fear that noise may increase and S/N may get worse due to stray light rays in the light receiving optical system. In contrast, in the case where the light receiving system of the mirror unit is arranged in parallel to the light projecting system so as to receive a light flux after being reflected by a mirror, the light receiving system can receive only a light flux reflected by a mirror without entering of sunlight. According to such an arrangement, in the case of a light flux which hit upon a scanning reflective mirror, S/N does not always get worse. Only in the case where a light flux reflected by a mirror enters the light receiving system, S/N gets worse. Accordingly, as compared with the scanning system with a single mirror, it is possible to improve a fear that S/N gets worse due to the influence of a scanning range in every directions and sunlight.

It is clear for a person skilled in the art from the embodiments written in this specification and a technical concept that the present invention should not be limited to the embodiments written in this specification, and includes other embodiments and modification embodiments. The descriptions and the embodiments of this specification are aimed to show exemplification only, and the scope of the present invention is shown with claims mentioned later. For example, the contents of the present invention described with the drawings can be applied to all the embodiments. For example, a light source should not be limited to laser. For example, a light source using LED may be employed.

REFERENCE SIGNS LIST

BE Reflective mirror
CL Collimator lens
LB, LB' Laser light flux
LD Semiconductor laser
LPS Light projecting system
LR Laser radar
LS Lens
M1 First mirror surface
M2 Second mirror surface
MU Mirror unit
OPS Light source
PD Photo diode (light receiving element)
PV Axis line
RM1, RM2 Reflective surface
RO Rotation axis
RPS Light receiving system
SL Spot light
SO Optical axis
SR Scanning surface
VP Virtual plane

The invention claimed is:
1. A scanning optical system, comprising:
a mirror unit equipped with a first mirror surface and a second mirror surface each of which inclines to a rotation axis; and
a light projecting system including at least one light source to emit a light flux toward the first mirror surface,
wherein a light flux emitted from the light source is reflected on the first mirror surface of the mirror unit, thereafter, reflected on the second mirror surface, and then, projected so as to scan in a main scanning direction onto an object in accordance with rotation of the mirror unit, and wherein the light flux toward the object has a cross sectional shape in a plane orthogonal to a direction toward the object in which a length in a direction orthogonal to the main scanning direction is longer than a length in the main scanning direction.

2. The scanning optical system described in claim 1, wherein the mirror unit includes a plurality of pairs of the first mirror surface and the second mirror surface, and an intersection angle between the first mirror surface and the second mirror surface in each pair is different from respective intersection angles of the other pairs.

3. The scanning optical system described in claim 1, wherein the mirror unit includes a plurality of pairs of the first mirror surface and the second mirror surface, and the plurality of pairs includes at least two pairs which have the same intersection angle between the first mirror surface and the second mirror surface and at least one pair which has an intersection angle different from the intersection angle of the two pairs.

4. The scanning optical system described in claim 1, further comprising:

a deflecting element which is disposed between the light source and the mirror unit and changes a proceeding direction of a light flux emitted from the light source.

5. The scanning optical system described in claim 1, wherein the light source has a light emitting surface in which a length along the rotation axis is linger than a length in a direction orthogonal to the rotation axis.

6. A light projecting and receiving apparatus, comprising:
a scanning optical system comprising:

a mirror unit equipped with a first mirror surface and a second mirror surface each of which inclines to a rotation axis; and a light projecting system including at least one light source to emit a light flux toward the first mirror surface, wherein a light flux emitted from the light source is reflected on the first mirror surface of the mirror unit, thereafter, reflected on the second mirror surface, and then, projected so as to scan in a main scanning direction onto an object in accordance with rotation of the mirror unit, and wherein the light flux toward the object has a cross sectional shape in a plane orthogonal to a direction toward the object in which a length in a direction orthogonal to the main scanning direction is longer than a length in the main scanning direction.

7. The light projecting and receiving apparatus described in claim 6, wherein the light receiving system reflects the reflected light flux reflected from the object by a second mirror surface, further reflects the reflected light flux by a first mirror surface, and thereafter, receives the reflected light flux with the light receiving element.

8. The scanning optical system described in claim 2, wherein the plurality of pairs of the first mirror surface and the second mirror surface includes a pair in which an intersection angle of the first mirror surface and the second mirror surface is 90 degrees.

* * * * *